United States Patent [19]

Kobayashi et al.

[11] Patent Number: 5,027,562
[45] Date of Patent: Jul. 2, 1991

[54] NUMERICALLY CONTROLLED GRINDING MACHINE FOR GRINDING A TAPERED SURFACE OF A WORKPIECE

[75] Inventors: Akiyoshi Kobayashi; Norikazu Sawaki, both of Kariya, Japan

[73] Assignee: Toyoda Koki Kabushiki Kaisha, Kariya, Japan

[21] Appl. No.: 276,541

[22] Filed: Nov. 28, 1988

[30] Foreign Application Priority Data

Nov. 27, 1987 [JP] Japan ................. 62-181790

[51] Int. Cl.$^5$ .................. B24B 49/00; B24B 51/00
[52] U.S. Cl. ................. 51/165.77; 51/165.75; 51/289 R
[58] Field of Search ............ 51/165.7, 165.74, 165.75, 51/165.76, 165.71, 289 R

[56] References Cited

U.S. PATENT DOCUMENTS

| | | | |
|---|---|---|---|
| 4,584,795 | 4/1986 | Akabane | 51/165.71 |
| 4,602,459 | 7/1986 | Drits | 51/165.77 |
| 4,615,149 | 10/1986 | Yoneda et al. | 51/165.71 |
| 4,625,461 | 12/1986 | Vetter | 51/165.77 |

Primary Examiner—Frederick R. Schmidt
Assistant Examiner—Bruce P. Watson
Attorney, Agent, or Firm—Oblon, Spivak, McClelland, Maier & Neustadt

[57] ABSTRACT

Disclosed is a numerically controlled grinding machine for grinding a tapered surface of a workpiece. In the grinding machine, a workpiece having a tapered portion and a reference end surface is supported on a traverse table in such a way that the workpiece is rotatable about an axis intersecting the Z-axis at a predetermined angle, which is equal to an angle formed between the tapered surface and the rotational axis of the workpiece. In addition, a measuring device for measuring the position of the reference surface is mounted on the wheel head.

4 Claims, 4 Drawing Sheets

NUMERICALLY CONTROLLED GRINDING MACHINE FOR GRINDING A TAPERED SURFACE OF A WORKPIECE

BACKGROUND OF THE INVENTION

1. Field of the Invention

The present invention relates to a numerically controlled grinding machine for grinding a tapered surface of a workpiece.

2. Description of the Prior Art

In a numerically controlled grinding machine of this kind, a wheel head and a table, which are movable along X axis and Z axis perpendicularly intersecting each other, are provided on the bed, and a workpiece is rotatably supported on the table in such a way that the rotational axis of the workpiece inclines with respect to the Z-axis by a predetermined angle which is equal to an angle formed between the tapered surface and the rotational axis of the workpiece. The tapered surface is ground by a grinding wheel supported on the wheel head.

In such grinding machine, the workpiece is supported on the table, for example, with a tapered mandrel having a tapered portion, whereat the inner tapered hole of the workpiece is engaged. In that case, the axial position of the workpiece changes due to the deviation of the diameter of the tapered hole of the workpiece. As a result, the distance in the X-axis direction between the grinding surface of the grinding wheel and the tapered surface of the workpiece also changes. Consequently, the machining error in the diameter of the ground tapered surface becomes large, unless the feed amount of the wheel head along X axis is compensated for according to the deviation. Prior art grinding machines, however, do not equip any apparatus for compensating such deviation. Even if the workpiece is supported on the table without using any mandrel, the same problem would occur when the axial position of the workpiece changes due to other factors.

To overcome this disadvantage, a grinding machine described in the U.S. Pat. No. 4,584,795 has been proposed. In the grinding machine described therein, a measuring device having a feeler, engageable with a reference end surface of a workpiece, is mounted on the bed in order to detect the positional deviation of the workpiece. The numerical control apparatus compensates a feed amount of the wheel head, which is used in the grinding operation for the tapered surface, depending upon the detected positional deviation, whereby the tapered surface can be ground to a predetermined diameter regardless of the positional deviation of the workpiece. The grinding machine however, has the disadvantages described below. First, the swivel table supported on the traverse table should be pivoted back to the original position, whereat the rotational axis of the workpiece is parallel to the Z-axis, for detecting the positional deviation of the workpiece, and then the swivel table should be pivoted to a predetermined angular position in order to grind the tapered surface of the workpiece. Accordingly, the machining time becomes longer than that of the conventional grinding machine because of the pivoting operation of the swivel table.

SUMMARY OF THE INVENTION

Accordingly, it is a primary object of the present invention to provide an improved numerically controlled grinding machine capable of precisely grinding a tapered surface of a workpiece regardless of any deviation of the axial position of the workpiece.

Another object of the present invention is to provide an improved numerically controlled grinding machine in which the positional deviation of a workpiece can be detected without any pivoting operations of the swivel table.

Another object of the present invention is to provide an improved numerically controlled grinding machine in which a compensation value, which is used for compensating a feed amount of the wheel head, can be calculated without any calculation errors.

Briefly, according to the present invention, there is provided a numerically controlled grinding machine which is designed for precisely grinding a tapered surface of a workpiece. In the grinding machine, the workpiece having a tapered surface is supported on a table to be rotated about an axis inclined with respect to the Z-axis by a predetermined angle which is equal to an angle formed between the tapered surface and the rotational axis of the workpiece. The grinding machine also provides a measuring device having a feeler engageable with a reference end surface of the workpiece so that the measuring device generates a signal when the feeler engages the reference end surface of the workpiece. Before starting grinding operation, the numerical control apparatus relatively moves the measuring device along a line parallel to the rotational axis of the workpiece from a measuring original position so that the feeler of the measuring device engages with the reference end surface of the workpiece. The movement along the line parallel to the rotational axis of the workpiece is accomplished, for example, by simultaneous movements of the wheel head and the traverse table. The position of the measuring device in the X-axis direction is detected by detecting means when the feeler engages with the reference end surface of the workpiece. Thereafter, the difference between the detected X-axis position of the measuring device and a theoretical X-axis position of the measuring device at the time when the feeler engages the reference end surface is calculated in order to obtain a compensation value. A predetermined feed amount of the wheel head, which is used in the grinding operation for the tapered surface, is compensated for depending on the calculated compensation value, whereby the tapered surface can be ground to a predetermined diameter regardless of the positional deviation of the workpiece.

With this configuration the positional deviation of the workpiece can be detected by moving the measuring device along a line parallel to the rotational axis of the workpiece, without any pivoting operation of the swivel table. Accordingly, the machining time can be shortened as compared with prior grinding machines. Furthermore, the compensation value can be directly obtained from the X-axis positional deviation of the measuring device from an ideal position. Thus, the compensation value can be obtained without any calculation errors which would occur by using trigonometrical functions.

According to another aspect of the invention, the theoretical X-axis position of the measuring device at the time when the feeler engages with the reference end surface is automatically obtained by using a master workpiece.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, in which.

DESCRIPTION OF THE PREFERRED EMBODIMENT

Figure 1:
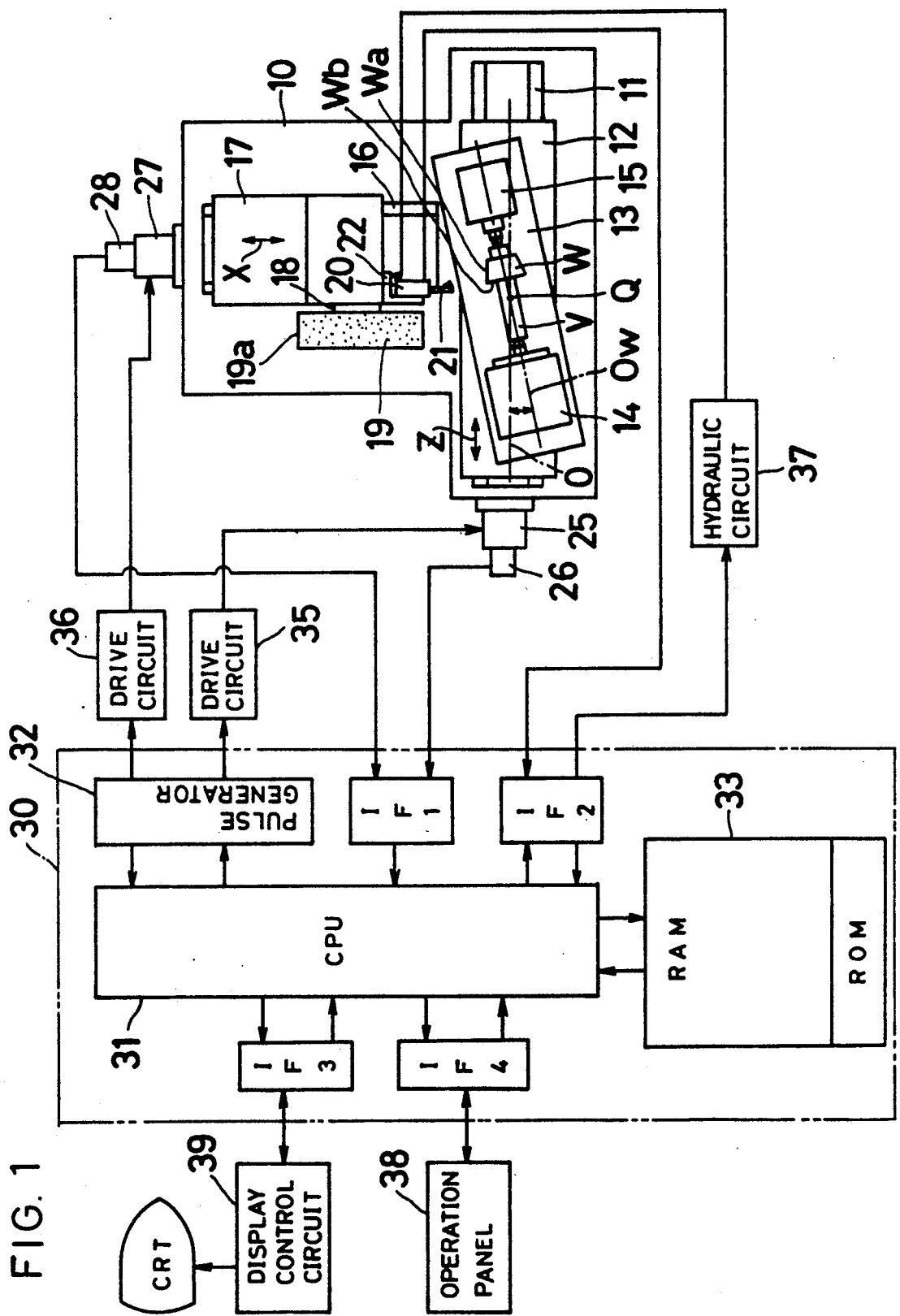
FIG. 1 is a plan view of a numerically controlled grinding machine according to the present invention, also showing a block diagram of a numerical control apparatus used for the machine.

Referring now to the drawings and particularly to FIG. 1 thereof, a traverse table 12 is guided on a bed 10 of a numerically controlled grinding machine through a guide rail 11 for movement in a Z-axis direction, and a wheel head 17 is also guided on the bed 10 through a guide rail 16 for movement in a X-axis direction which perpendicularly intersects the Z-axis direction. The movements of the traverse table 12 and the wheel head 17 are controlled by a numerical control apparatus 30 through servomotors 25 and 27. The positions of the traverse table 12 and the wheel read 17 are detected by encoder 26 and 28, and the detected positions are fed back to the numerical control apparatus 30.

Figure 2:
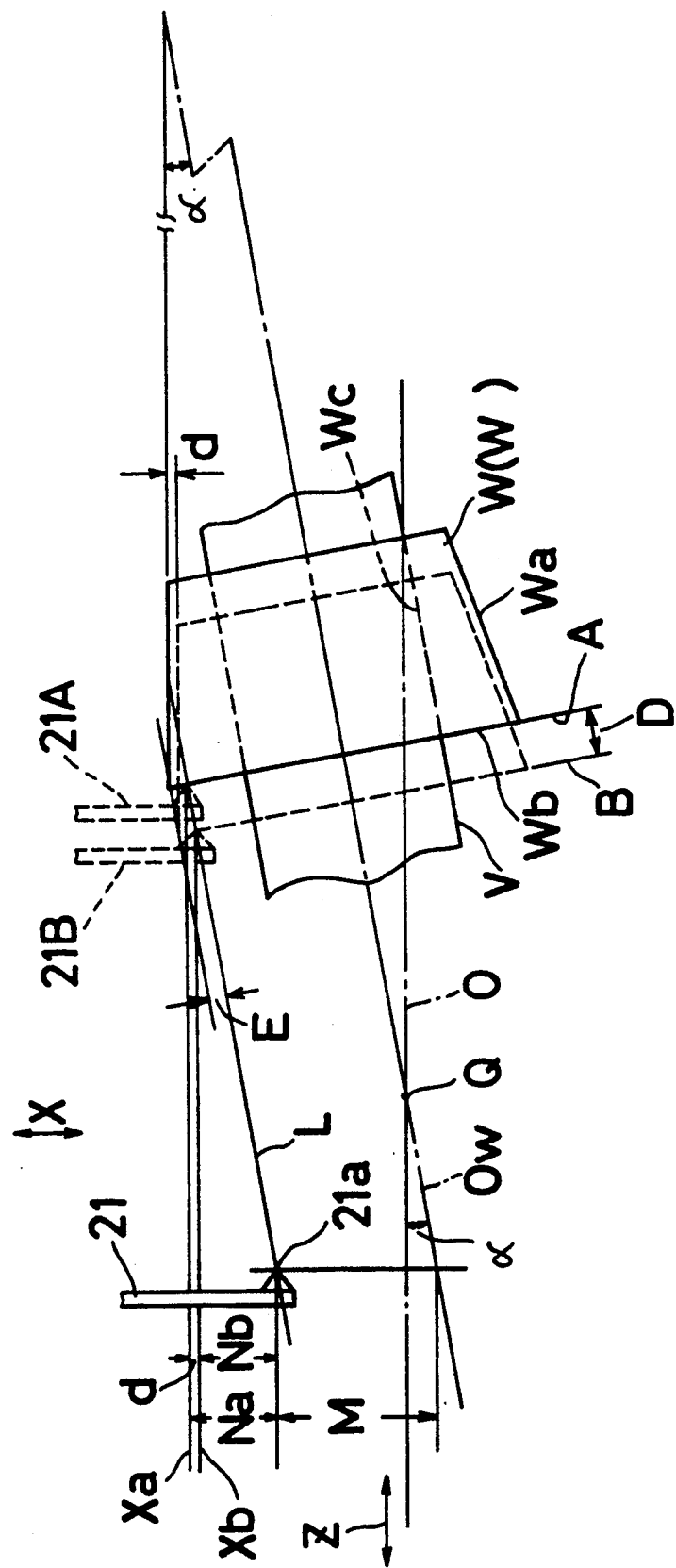
FIG. 2 is an explanatory chart illustrating operational steps in measuring positional deviation of a tapered surface of a workpiece.

A work head 14 and a tail stock 15 are mounted on the traverse table 12 through a swivel table 13 in such a way that the work head 14 and the tail stock 15 face each other on a common axis. A tapered mandrel V for fixing a workpiece W is supported between the work head 14 and the tail stock 15 through their centers, and is rotated by the work head 14. The swivel table 13 is pivotable about vertical axis Q, and is fixable to the traverse table 12 at any angle position. The workpiece W having a tapered surface Wa to be ground is supported by the tapered mandrel V through a tapered hole Wc formed inside of the workpiece, as shown in FIG. 2, and a reference end surface Wb perpendicularly intersecting the rotational axis Ow of the workpiece W is formed at the left end portion of the tapered surface Wa. The swivel table 13 is pivoted and then fixed to the traverse table 12 in such a way that the rotational axis Ow of the workpiece W inclines with respect to the Z-axis direction by an angle $\alpha$, which is equal to an angle formed between the tapered surface Wa and the rotational axis Ow of the workpiece W, as shown in FIG. 2. As a result, a portion of the tapered surface Wa, which faces a grinding wheel 19, is located in a vertical plane parallel to the Z-axis direction.

As shown in FIG. 1, the grinding wheel 19 is carried on the wheel head 17 through a wheel spindle 18, which is parallel to the Z-axis direction, and is rotated by a drive motor (not shown). The grinding wheel 19 has a cylindrical grinding surface 19a, the width of which is wider than that of the tapered surface Wa, on its peripheral surface. On a side surface of the wheel head 17 facing to the traverse table 12, an end surface measuring device 20 having a feeler 21 is mounted through a hydraulic device 22. The operation of hydraulic operation device 22 is controlled by the numerical control apparatus 30 such that the end surface measuring device 20 is swung about an axis parallel to the Z-axis direction between a measuring position and a retracted position. When the end surface measuring device 20 is swung down to the measuring position, as shown in FIG. 1 and FIG. 2, the feeler 21 is also swung down toward the workpiece W so that the end point 21a of the feeler 21 faces the reference end surface Wb. When the end surface measuring device 20 is swung up to the retracted position, the feeler 21 is swung up to a position whereat the feeler 21 can not contact the reference end surface Wb. The end surface measuring device 21 generates a signal when the feeler 21 contacts the reference end surface Wb, as shown by sign 21A or 21B in FIG. 2, during the process of relative movement of the wheel head 17 from the original position along a line parallel to the rotational axis Ow of the workpiece W.

Figure 3:
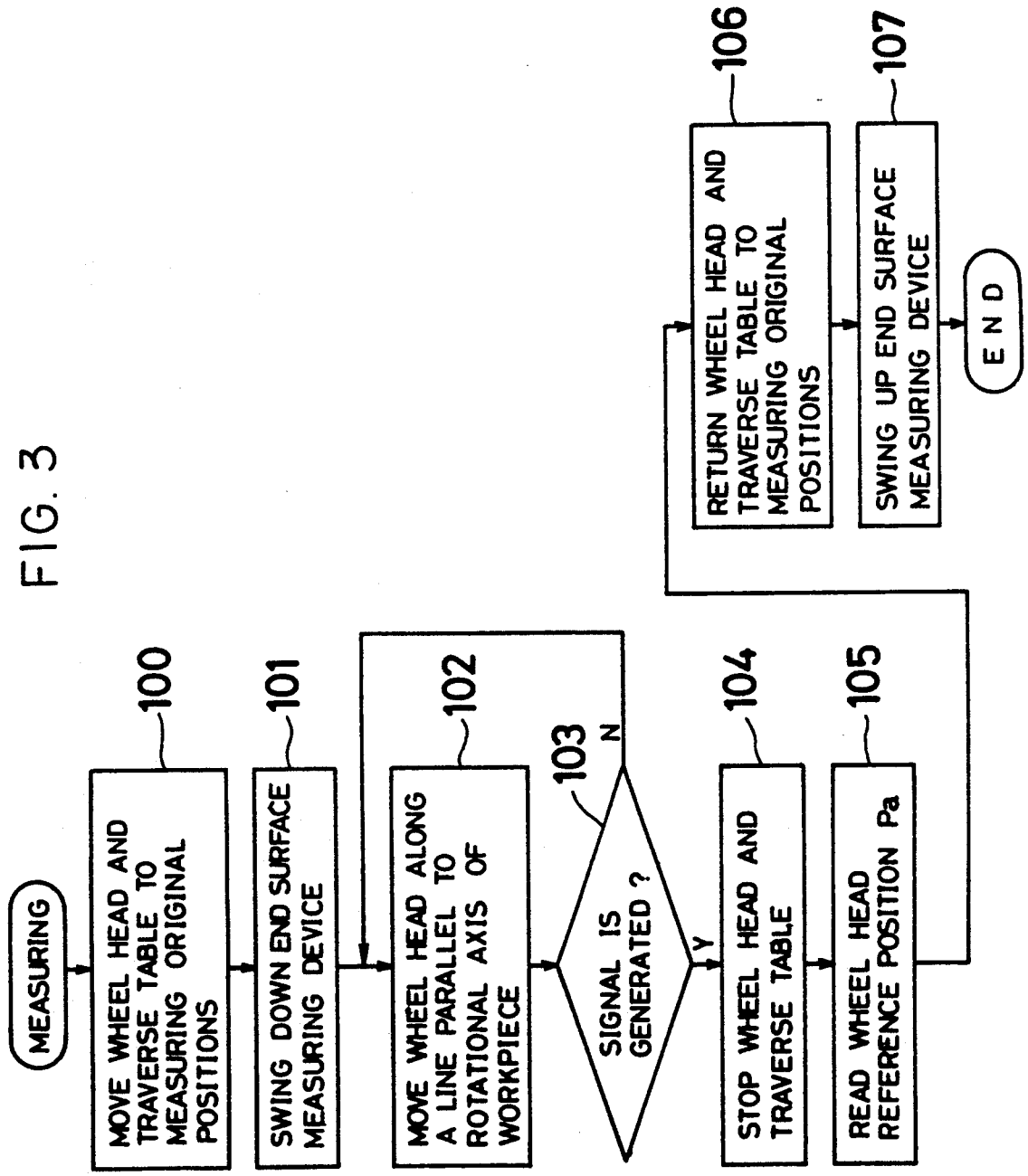
FIG. 3 is a flow chart explaining the operation of the CPU at the time of measuring a master workpiece.
Figure 4:
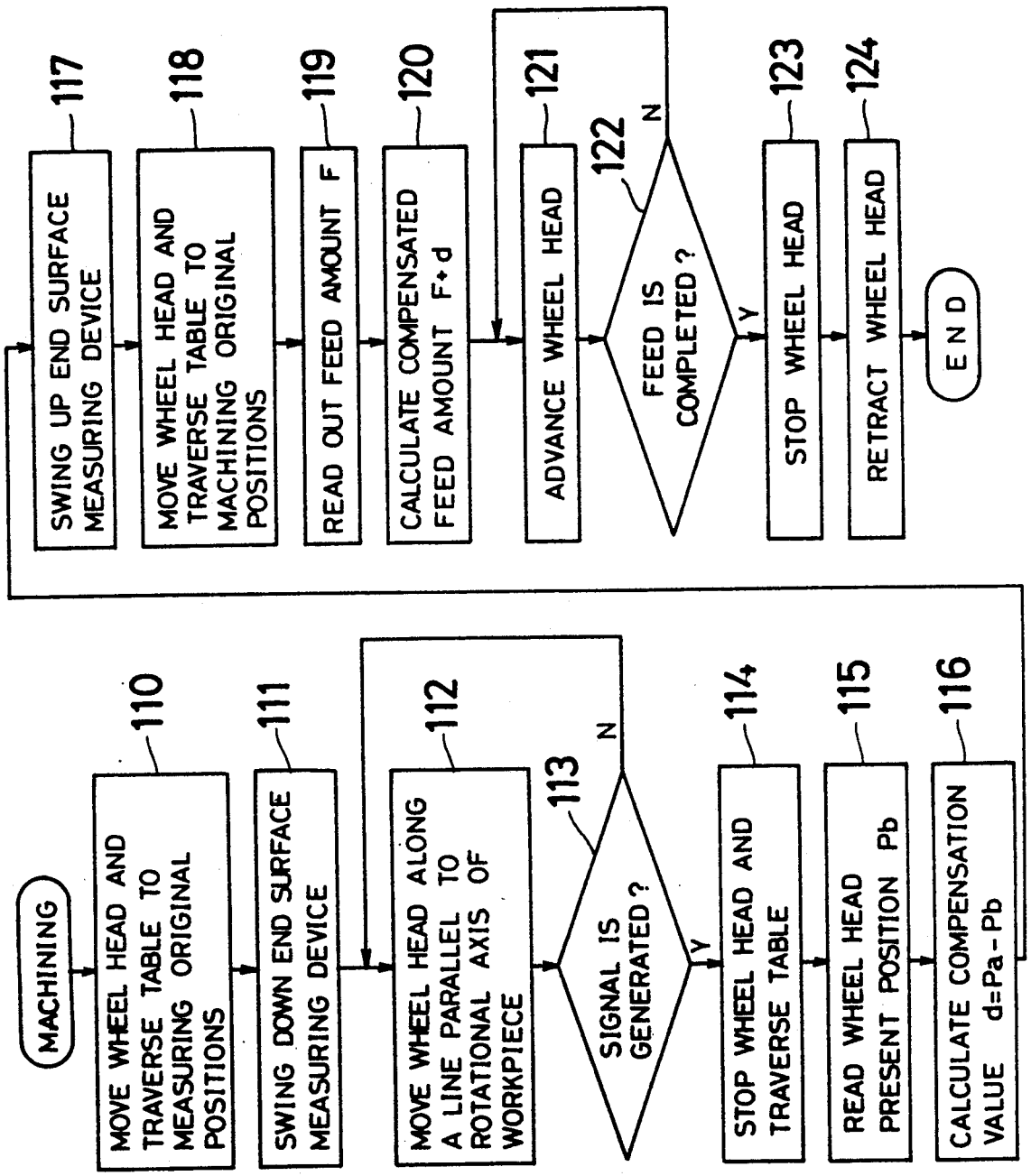
FIG. 4 is a flow chart explaining the operation of the CPU at the time of grinding a workpiece.

The numerical control apparatus 30 comprises a central processing unit (hereinafter referred to a "CPU") 31, a pulse generator 32 and a memory device 33. The pulse generator 32, which is controlled by the CPU 31, distributes drive pulses to drive circuits 35 and 36 in order to rotate the servomotors 25 and 27, which move the traverse table 12 and the wheel head 17, respectively. The positions of the traverse table 12 and the wheel head 17 are detected by the encoders 26 and 28, and the detected positions are fed back to the CPU 31 through an interface IF1. The hydraulic operation device 22 is connected to the CPU 31 through a hydraulic circuit 37 and an interface IF2, and the signal generated by the end surface measuring device 20 are input to the CPU 31 through the interface IF2. An operation panel 38 is connected to the CPU 31 through an interface IF4, and a display control circuit 39 for controlling a CRT display device 40 is also connected to the CPU 31 through an interface IF3. In the memory device 33, control programs for controlling the operations shown in FIG. 3 and FIG. 4 are stored, and constant values and operation formulas, which are used in the operations, are also stored in the memory device 33. Furthermore, the memory device 33 has a memory area for storing various variables.

The operation of the above described embodiment will now be explained with flow charts shown in FIG. 3 and FIG. 4.

At first, the numerical control apparatus 30 is started so that the various variables are reset to initial values. The tapered mandrel V supporting a master workpiece Wo, the dimension of which is the same as that of workpieces to be ground, has been put in between the work head 14 and the tail stock 15, and is supported by the centers thereof. The workpiece W shown by a solid line in FIG. 2 indicates the master workpiece Wo, and the reference end surface Wb is located at a position A. Under this condition, the measuring operation is executed according to the control program illustrated by the flow chart shown in FIG. 3.

At first, numerical control apparatus 30 distributes drive pulses to the drive circuits 35 and 36 at step 100 so that the wheel head 17 and the traverse table 12 are moved to their original measuring positions, respectively. Then, the end surface measuring device 20 is swung down to the measuring position at step 101. By this operation, the feeler 21 of the end surface measuring device 20 is located at its measuring original position indicated by the solid line in FIG. 2. In the next step 102, the numerical control apparatus 30 moves the wheel head 17 and the traverse table 12 simultaneously, by simultaneously distributing X-axis command pulses and Z-axis command pulses to the drive circuits 35 and 36, so that the end surface measuring device 20 is relatively moved along a path parallel to the rotational axis Ow of the workpiece. By this operation, the end point 21a of the feeler 21 is moved along a line L, which is parallel to the rotational axis Ow and is away from the rotational axis Ow by a distance M in the X-axis direction, as shown in FIG. 2. The moving operation at step 102 is repeated through step 103 until the feeler 21 contacts the reference end surface Wb. When the feeler 21 reaches the position indicated by the symbol 21A, the end point 21a of the feeler 21 contacts the reference surface Wb of the master workpiece Wo so that a signal is generated by the end surface measuring device 20. When the signal is output from the end surface measuring device 20, operation of the CPU 31 moves from the step 103 to step 104 so that the movements of the wheel head 17 and the traverse table 12 are stopped. Then, the X-axis position of the wheel head 17 is read out as a wheel head reference position Pa by the CPU 31, and the wheel head reference position Pa is stored in a predetermined memory area. Under this condition, the end point 21a of the feeler 21 is located at a position Xa in the X-axis direction, which is spaced from the measuring original position by a distance Na, as shown in FIG. 2, and is contacting with the reference end surface Wb at an inward position, which is spaced from the edge of the reference end surface Wb by a distance E. After these operations, the wheel head 17 and traverse table 12 are moved back to the measuring original positions at step 106, and the end surface measuring device 20 is swung up to the retracted position. Then, the process shown in FIG. 3 is ended.

The machining operation for each workpiece W is executed according to the control program illustrated by the flow chart shown in FIG. 4. The tapered mandrel V fixing a workpiece W has been carried in, and is supported between the work head 14 and tail stock 15 so as to be rotated. The grinding wheel 19 is also rotated. The workpiece W is indicated by a dotted line in FIG. 2, and the reference end surface Wb is located at a position B, which is spaced from the position A by a distance D, due to the dimensional deviation of the tapered hole Wc machined during a premachining process. The process at steps 110 through 114 in the flow chart shown in FIG. 4 is the same as the process at steps 100 through 104 in the flow chart shown in FIG. 3. By the operation at steps 110 through 114, the end surface measuring device 20 is moved from its measuring original position along to the path parallel to the rotational axis Ow until the end point 21a of the feeler 21 contacts with the reference end surface Wb of the workpiece W. Thereafter, the X-axis position of the wheel head 17 is read out as a wheel head present position Pb at step 115. At this moment, the feeler 21 is located at the position indicated by the sign 21B, as shown in FIG. 2, and the end point 21a of the feeler 21 is located at a position Xb in the X-axis direction, which is spaced from the measuring original position by a distance Nb. The end point 21a is contacting with the reference end surface Wb at an inward position, which is away from the edge of the reference end surface Wb by the distance E. At the next step 116, the numerical control apparatus 30 calculates a compensation value d according to the following equation.

$$d = Pa - Pb$$

The compensation value d is equal to the distance in the X-axis direction between the positions Xa and Xb of the end point 21a of the feeler 21, and is also equal to the positional difference in the X-axis direction between the tapered surfaces Wa of the master workpiece Wo and the tapered surface Wa of the workpiece W at the grinding position facing to the wheel head 17.

Thereafter, the end surface measuring device 20 is swung up to the retracted position at step 117, and the wheel head 17 and the traverse table 12 are moved to their original machining positions at step 118, so that the grinding surface 19a of the grinding wheel 19 faces the tapered surface Wa of the workpiece W. Then the numerical control apparatus 30 reads a feed amount F, which is separately stored in the memory device 33, at step 119. The feed amount F is a feed amount in the X-axis direction from the machining original position, and is used in the machining operation for the tapered surface Wa. At the next step 120, the numerical control apparatus 30 calculates a compensated feed amount F+d. Then the numerical control apparatus 30 advances the wheel head 17 at step 121 in order to grind the tapered surface Wa with the grinding wheel 19. When the grinding wheel is fed from the machining original position by the compensated feed amount F+d, the process of the CPU 31 moves from step 122 to step 123 so that spark out grinding is accomplished for a predetermined period by stopping the wheel head 17. Thereafter, the wheel head 17 is retracted at step 124, and then the machining operation for the workpiece W is ended. Afterward the workpiece W is replaced with a new workpiece, and then the tapered surface of the new workpiece is ground by the same operation as the operation described above according to the flow chart shown in FIG. 4.

As described above, the wheel head 17 is fed by the compensated feed amount, which compensates for the positional deviation d of the tapered surface Wa. Accordingly, even if the workpiece W is located at a position which differs from a theoretical position whereat the master workpiece Wo was located, the error in the diameter of the tapered surface Wa is compensated for so that the machining accuracy is improved.

Furthermore, since the feeler 21 is moved from the measuring original position along the line parallel to the rotational axis Ow of the workpiece W, by the two axes pulse distribution, so as to detect the position of the reference end surface Wb. In such operation, the X-axis position of the wheel head 17 at the time when the feeler 21 contacts with the reference end surface Wb changes depending on the positional divergence of the workpiece W. Namely, the wheel head 17 reaches to the position Pa at the time of measuring the master workpiece Wo, and reaches position Pb at the time of measuring the workpiece W. The positional difference d between Pa and Pb is equal to the X-axis positional divergence of the tapered surface Wa of the workpiece W at the grinding position. Accordingly, the compensation value d is directly obtained from the positional difference between the position Pa and Pb without any complicated calculations involving trigonometric functions. Moreover, since the compensation value d can be obtained without any calculation errors which would occur by using the trigonometric functions, the machining accuracy is better than that of the grinding machine in which the compensation value is calculated with trigonometric functions.

In the above described embodiment, the tapered surface Wa is ground without any traverse movement of the grinding wheel 19 because the width of the grinding surface 19a of the grinding wheel 19 is wider than that of the tapered surface Wa. This invention, however, can be used in grinding machines in which the tapered surface Wa is ground by traverse movement of the grinding wheel, which has a grinding surface narrower than the width of the tapered surface Wa.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A numerically controlled grinding machine for grinding a tapered surface of a workpiece, which comprises:

a bed;

a table mounted on said bed;

a swivel table mounted on said table for swiveling movement about a substantially vertical axis;

a wheel head mounted on said bed;

a first moving mechanism for changing positional relationship in an X-axis direction between said wheel head and said table;

a second moving mechanism for changing positional relationship in an Z-axis direction between said wheel head and said table;

workpiece supporting means mounted on said swivel table for selectively supporting a master workpiece having a tapered surface and a workpiece having a tapered surface to be ground in order to rotate said master workpiece and workpiece, said swivel table being located at a predetermined machining angle position so that the rotational axis of said workpiece inclines with respect to the Z-axis direction by a predetermined angle which is equal to an angle formed between the tapered surface and the rotational axis of said master workpiece;

means for feeding said wheel head from a predetermined machining original position along the X-axis direction by a predetermined feed amount so as to grind said tapered surface of said workpiece under the state that said swivel table is located at said predetermined machining angle position;

a measuring device having a feeler, said measuring device being supported on said wheel head and being selectively engageable with reference end surfaces of said master workpiece and said workpiece for generating a signal when said feeler of said measuring device engages with said reference end surfaces;

first moving means for simultaneously actuating said first and second moving mechanism in order to move said wheel head from a predetermined measuring original position along a path inclined with respect to the Z-axis direction by said predetermined angle and being parallel to the rotational axis of said workpiece, during a time period when said master workpiece is supported on said table and under the state that said swivel table is located at said predetermined machining angle position, until said feeler of said measuring device engages with said reference end surface of said master workpiece;

first detecting means for detecting a first X-axis position of said wheel head when said signal is generated by said measuring device during movement of said wheel head by said first moving means;

second moving means for simultaneously actuating said first and second moving mechanism in order to move said wheel head from a predetermined measuring original position along a path inclined with respect to the Z-axis direction by said predetermined angle and being parallel to the rotational axis of said workpiece, during a time period when said workpiece is supported on said table and under the state that said swivel table is located at said predetermined machining angle position, until said feeler of said measuring device engages with said reference end surface of said workpiece;

second detecting means for detecting a second X-axis position of said wheel head when said signal is generated by said measuring device during movement of said wheel head by said second moving means; and means for compensating said predetermined feed amount depending on the difference between said first X-axis position of said wheel head detected by said first detecting means and said second X-axis position of said wheel head detected by said second detecting means.

2. A numerically controlled grinding machine as set forth in claim 1, wherein said compensating means comprises:

means for calculating a compensation value by calculating the positional difference between said first X-axis position and said second X-axis position of said wheel head; and means for compensating said feed amount of said wheel head by adding said compensation value to said feed amount.

3. A numerically controlled grinding machine as set forth in claim 1, wherein:

said measuring means is supported on said wheel head though a hydraulically operated device which includes means for swinging down said measuring device to a measuring position whereat said feeler of said measuring device is engageable with said reference end surfaces and for swinging up said measuring device to a retracted position whereat said feeler of said measuring device is not engageable with said reference end surfaces.

4. A numerically controlled grinding machine for grinding a tapered surface of a workpiece, which comprises:

a bed, a wheel head mounted on said bed for movement in an X-axis direction;

a table mounted on said bed for movement in a Z-axis direction which intersects perpendicularly with the X-axis direction;

a swivel table mounted on said table for swiveling movement about a substantially vertical axis;

a first servomotor for moving said wheel head in the X-axis direction;

a second servomotor for moving said table in the Z-axis direction;

a first drive circuit for driving said first servomotor in response to command pulses applied thereto;

a second drive circuit for driving said second servomotor in response to command pulses applied thereto;

workpiece supporting means mounted on said swivel table for supporting a workpiece having a tapered surface in order to rotate said workpiece so that the rotational axis of said workpiece inclines with respect to said Z-axis direction by a predetermined angle, which is equal to an angle formed between the tapered surface and the rotational axis of said workpiece;

first pulse distribution means for distributing a predetermined number of command pulses to said first drive circuit so as to feed said wheel head from a predetermined machining original position along the X-axis direction for grinding operation of said tapered surface of said workpiece to a desired size, under the state that said swivel table is located at said predetermined machining angle position;

a measuring device having a feeler, said measuring device being supported on said wheel head and engageable with a reference end surface of said workpiece for generating a signal when said feeler of said measuring device engages with said reference end surface;

second pulse distribution means for simultaneously distributing command pulses to said first and second drive circuits so as to move said wheel head from a predetermined measuring original position along a path inclining with respect to the Z-axis direction and being parallel to the rotational axis of said workpiece, under the state that said swivel table is located at said predetermined machining angle position, until said feeler of said measuring device engages with said reference end surface;

detecting means for detecting an X-axis position of said wheel head when said signal is generated by said measuring device;

calculation means for calculating the difference between the X-axis position of said wheel head detected by said detecting means and a predetermined theoretical X-axis position of said wheel head, said theoretical X-axis position being indicative of an X-axis position of said wheel head at which said signal would be generated from said measuring device during movement by said second pulse distribution means if said reference end surface of said workpiece is located at a predetermined axial reference position; and compensating means for changing said number of command pulses distributed by said first pulse distribution means depending on the difference calculated by said calculation means.

* * * * *